United States Patent
Bowline et al.

(10) Patent No.: US 9,710,966 B2
(45) Date of Patent: Jul. 18, 2017

(54) STYLING OF COMPUTER GRAPHICS HAIR THROUGH VOLUMETRIC FLOW DYNAMICS

(71) Applicant: LUCASFILM ENTERTAINMENT COMPANY LTD., San Francisco, CA (US)

(72) Inventors: Stephen D. Bowline, San Francisco, CA (US); Nicholas Grant Rasmussen, Fairfax, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 22 days.

(21) Appl. No.: 14/488,086

(22) Filed: Sep. 16, 2014

(65) Prior Publication Data

US 2016/0078675 A1 Mar. 17, 2016

(51) Int. Cl.
*G06T 17/20* (2006.01)
*G06T 13/40* (2011.01)

(52) U.S. Cl.
CPC .............. *G06T 17/20* (2013.01); *G06T 13/40* (2013.01); *G06T 2210/24* (2013.01)

(58) Field of Classification Search
CPC ................................ G06T 13/20; G06T 13/40
See application file for complete search history.

(56) References Cited

U.S. PATENT DOCUMENTS

| | | | | |
|---|---|---|---|---|
| 6,720,962 B1* | 4/2004 | Alter | ...................... | G06T 13/20 345/420 |
| 7,450,122 B2 | 11/2008 | Petrovic et al. | | |
| 7,468,730 B2 | 12/2008 | Petrovic et al. | | |
| 2002/0021302 A1* | 2/2002 | Lengyel | .................. | G06T 17/20 345/583 |
| 2007/0291043 A1* | 12/2007 | Bruderlin | ................ | G06T 13/40 345/581 |
| 2011/0063291 A1* | 3/2011 | Yuksel | .................... | G06T 17/20 345/420 |

OTHER PUBLICATIONS

Yuksel, Cem, Scott Schaefer, and John Keyser. "Hair meshes." ACM Transactions on Graphics (TOG). vol. 28. No. 5. ACM, 2009.*

(Continued)

*Primary Examiner* — Daniel Hajnik
(74) *Attorney, Agent, or Firm* — Kilpatrick Townsend & Stockton LLP

(57) ABSTRACT

Methods are disclosed for the computer generation of data for images that include hair, fur, or other strand-like material. A volume for the hair is specified, having a plurality of surfaces. A fluid flow simulation is performed within the volume, with a first surface of the volume being a source area through which fluid is simulated to enter the volume, and a second surface being an exit surface through which fluid is simulated as exiting the volume. The fluid flow simulation may be used to produce fluid flow lines, such as from a velocity vector field for the fluid. Fluid flow lines are selected, and image data of hairs that follow the fluid flow lines are generated. Other embodiments include generating animation sequences by generating images wherein the volume and surfaces vary between frames.

15 Claims, 12 Drawing Sheets

(56) References Cited

OTHER PUBLICATIONS

Hadap, Sunil et al., Hair Shape as Streamlines of Fluid Flow, The 30.sup.th Int'l. Conference on Computer Graphics and Interactive Techniques (SIGGRAPH), Jul. 29, 2003, San Diego, CA, pp. 1-21.*
Malik, Shahzad. "A Sketching Interface for Modeling and Editing Hairstyles." SBM. 2005.*
Volino, Pascal, and Nadia Magnenat-Thalmann. "Real-time animation of complex hairstyles." IEEE Transactions on Visualization and Computer Graphics 12.2 (2006): 131-142.*
Choe, et al., "A Statistical Wisp Model and Pseudophysical Approaches for Interactive Hairstyle Generation," IEEE Transactions on Visualization and Computer Graphics, vol. 11, No. 2, Mar./Apr. 2005, 11 pages total.
Hadap, et al., "Interactive Hair Styler based on Fluid Flow," MIRALab, CUI, University of Geneva, 2000, 14 pages total.
Petrovic, et al., "Volumetric Methods for Simulation and Rendering of Hair," Tech. Rep. 06-08, Pixar Animation Studios, 2005, 6 pages total.
Ward, et al., "A Survey on Hair Modeling: Styling, Simulation and Rendering," IEEE Transactions on Visualization and Computer Graphics (TVCG), vol. 13, No. 2, p. 213-34, Mar.-Apr. 2007, 21 pages total.
Yu, T., "Modeling Realistic Virtual Hairstyles," PG '01 Proceedings of the $9^{th}$ Pacific Conference on Computer Graphics and Applications, Oct. 16, 2001, IEEE Computer Society Washington, DC, USA, ISBN: 0-7695-1227-5, p. 295, 10 pages total.

\* cited by examiner

STYLING OF COMPUTER GRAPHICS HAIR THROUGH VOLUMETRIC FLOW DYNAMICS

BACKGROUND OF THE INVENTION

Computer-generation of images or animations of characters often aims for realism. However, this can be difficult in the case of human characters or animals with hair or fur. In particular, realistic computer images of hair or fur are often difficult to generate as a result of complexities in simulating a high number of individual hairs and fur. For example, individual simulation of a realistic quantity of human hairs can be intractable since the human head can comprise on the order of 100,000 strands of hair. It would be desirable to have methods and systems for efficiently simulating hair/fur position and shape both for static and dynamically moving hair/fur.

BRIEF SUMMARY OF THE INVENTION

In various embodiments, methods and systems for simulating hair or fur, and for generating images including hair or fur are disclosed. In one aspect, methods and systems are disclosed for generating image data of objects from which hair or fur extends from source areas of the object's surface. It should be appreciated that while embodiments may be described with respect to hair, embodiments permit the simulation and generation of images for any strand type extension (e.g., fur).

In one embodiment, a method is disclosed in which a representation of a character is implemented in a computing system, and comprises receiving a two-dimensional (2D) polygonal character surface mesh for a surface component of the character in a virtual three-dimensional (3D) space. A fully closed 3D polyhedral hair mesh is added to the two-dimensional (2D) polygonal character surface mesh. A source area is identified on the surface of the fully closed 3D polyhedral hair mesh. This hair mesh may comprise multiple cells, tetrahedra, or the other polyhedra that cover a 3D hair volume, in which hair image data is to be simulated.

One or more exit areas on the surface are also identified that are disjoint from the source area. Boundary surface areas are identified that are disjoint from the source area and the exit areas. On the source area a plurality of fluid entrance points is defined, and on the exit areas a plurality of fluid exit points is defined. These definitions may take the form of specifying boundary conditions for a fluid flow simulation.

A fluid flow simulation is performed within the 3D polyhedral hair mesh so that fluid is simulated as entering through the fluid entrance points on the source area and exiting through the exit points on the exit areas. The direction and magnitude of fluid flow vectors at the entrance points may be received from the interactive input of a user. The boundary surface areas are simulated as having no fluid flow through them. From the fluid flow simulation data, a plurality of fluid flow lines are obtained, the fluid flow lines being curves having tangents to the velocity field of the fluid flow.

The fluid flow simulation may involve solving Navier-Stokes partial differential equations for fluid flow, with the boundary and initial values at least as given by fluid flow values specified for the source area, exit areas, and boundary surfaces. In some applications the fluid simulation may use a method in which the Navier-Stokes equations are simplified to solving Poisson's equations in the 3D polyhedral hair mesh for the fluid pressure p.

Image data is then generated for a plurality of hairs within the 3D polyhedral hair mesh. The image data for the hairs depicts each of the hairs as lying along a respective fluid flow line. In additional and/or alternative embodiments, the image data may further comprise specifying at least one of thickness, color, translucency, and weight for at least one hair.

In another embodiment, a polygonal surface mesh is received, and a plurality of entrance points along a source area are defined. A plurality of exit points on the polygonal surface mesh is also defined. A flow of fluid is simulated, and based on the simulation a plurality of fluid flow lines are generated that extend from the entrance points to the exit points. Then image data is generated for a plurality of strands, wherein each strand extends along a corresponding generated fluid flow line.

Additional and/or alternative embodiments may involve any of the following elements. 3D modeling methods or constructive solid geometry techniques may be used to generate the 3D polyhedral hair mesh. The fluid entrance points may be designated interactively by a user on the 2D polygonal character surface mesh using a user interface. Embodiments may allow for user modification of the image data for the hair. For example, a user may be able to modify the image data for the hair so that certain selected hairs do not extend along fluid flow lines.

Various embodiments may create image data for hair in animation images, e.g., a sequence of frames for video. One set of embodiments uses time-varying solutions for the fluid flow simulations, with image data for a frame derived from the fluid flow simulation data at a particular time step. Another set of embodiments may use generation of different 3D polyhedral hair meshes for each frame, and perform separate fluid flow simulations to produce the image data for the hair in each frame.

In various embodiments, a representation of a 3D hair volume that has not necessarily been decomposed into a 3D polyhedral hair mesh may be an input for a method or system for generating image data for hair on a character. Thereafter, either a 3D polyhedral hair mesh may be generated from the 3D hair volume and a fluid flow simulation performed using the 3D polyhedral hair mesh, or a fluid flow simulation may be performed that does not rely on decomposing the 3D hair volume into cells or polyhedra.

Embodiments can include systems comprising processors linked with memory, and that execute instructions for performing the methods for generating image data including hair on a character. Embodiments can include computer program products embodied in a non-transitory computer-readable storage medium and comprising instructions that when executed by a processor perform any of the methods described for generating image data for hair.

These and other exemplary embodiments are to be understood in relation to the included drawings and the Detailed Description.

DETAILED DESCRIPTION OF THE INVENTION

I. Introduction

Exemplary embodiments described herein are directed to methods, systems and computer products for simulating hair or fur and generating images including hair or fur. In certain embodiments, the methods, systems and computer products are directed to enabling the generation of image data for an image of an object having hair extending from a part of its surface. The image data can be generated by performing a fluid flow simulation within a volume in which the hair is to be depicted. The image data so generated can be used as part of image data used by a rendering system to depict an image comprising the object and the hair.

Though the exemplary embodiments may be described in relation to generating image data for actual human hair or animal fur, it will apparent to one of skill in the art that the embodiments disclosed herein may be applied to produce image data comprising other strand-like extensions from an object. For example, in another embodiment, the methods and systems may be used to generate image data for sea grass or kelp strands in an underwater scene. Still other examples include feathers on a bird, the yarns of a mop and strings from balloons. As used in this application, the term "hair" will denote not just growths of epidermal hair or fur follicles of a human or animal, but also any slender and/or threadlike extensions from an object.

Figure 1A:
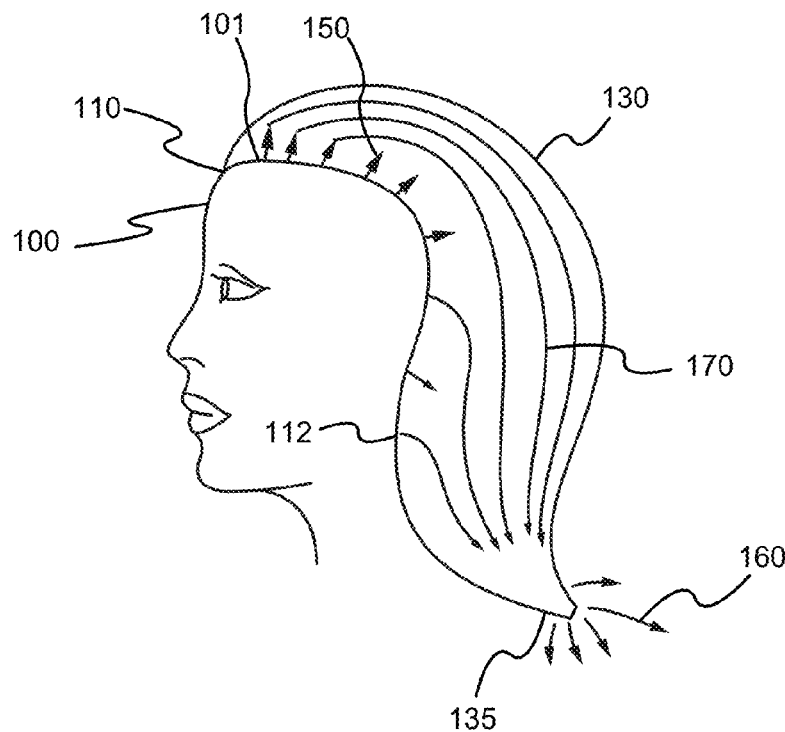
FIG. 1A illustrates a method of generating image data of hair on a character as simulated by a fluid flow within a volume, according to an embodiment.
Figure 1B:
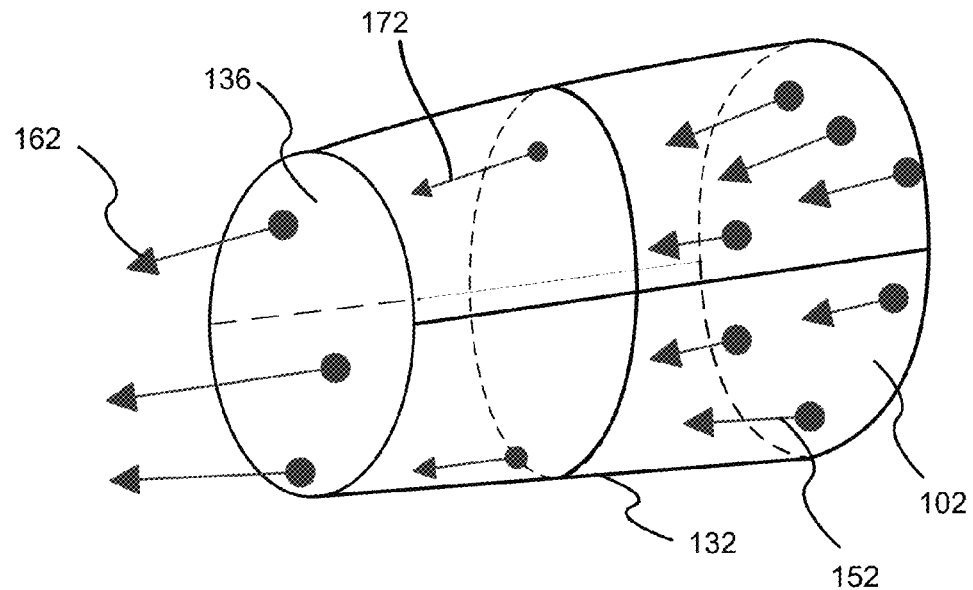
FIG. 1B illustrates samples of a vector field corresponding to a fluid flow in a cylindrical frustrum.
Figure 2:
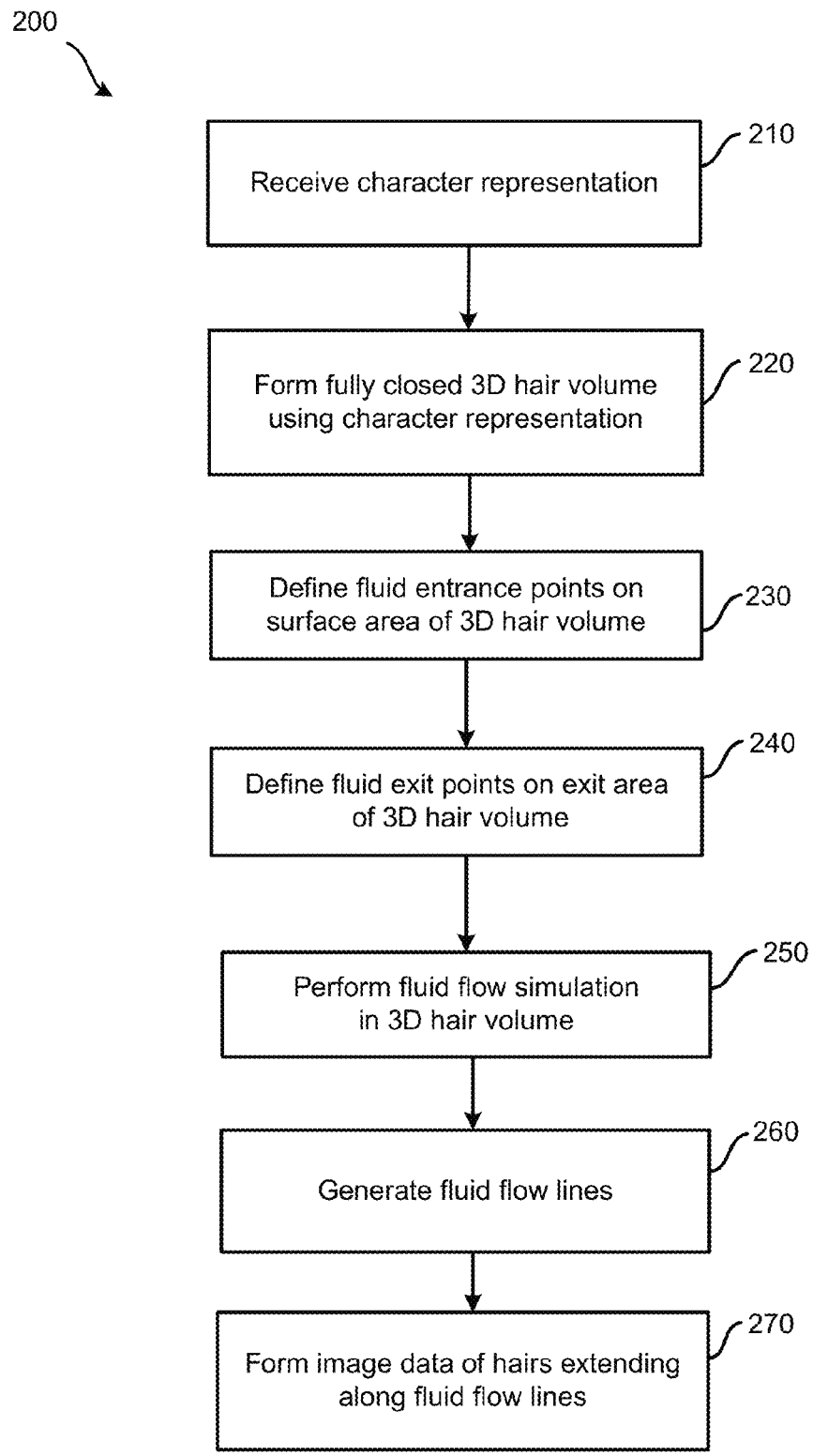
FIG. 2 is a flow chart of a method for generation of data for images of objects comprising hair or fur, according to an embodiment.

This Introduction will give a description of an exemplary method for generating image data for hair using fluid flow simulations with reference to FIGS. 1A, 1B and 2. Sections following thereafter will give additional details as well as describe additional and/or alternative embodiments.

A. Overview

FIG. 1A schematically depicts a character 100 on which hair is simulated, according to an embodiment. The term character will be used herein to refer to any virtual figure, including a person, animal (real or fictitious), plant or solid surface, or part thereof, for which hair is to be simulated. The character may be computer-generated, or obtained from motion capture. The character may be represented by a three-dimensional (3D) polyhedral character mesh, as a polygonal character surface mesh, or other data structure. In the first case, the 3D polyhedral character mesh can be used to generate a polygonal surface character mesh, in one instance, by selecting surface faces of the polyhedra that form the 3D polyhedral character mesh.

The scalp 101 of the character in FIG. 1A extends from a point 110 on the forehead to a point 112 at the top of the neck. The scalp is selected as the area on the character's surface from which hair is to extend in an image.

A 3D hair volume 130 is generated that extends from the scalp. The 3D hair volume comprises a virtual representation of a finite volume in a 3D space. One part of the 3D hair volume 130 is a surface that conforms to the scalp. As described below, the 3D hair volume may be subdivided into polyhedra for use in numerical fluid flow simulations. When so subdivided, 3D hair volume is termed a 3D polyhedral hair mesh. Various methods of generating 3D hair volumes can be used, e.g., constructive solid geometry (CSG), solid modeling, or other surface or solid generation methods. The scalp surface is used as a fluid entrance area on the hair volume, and an exit area 135 can be selected as locations for fluid exit points.

Once the 3D hair volume has been generated and entrance and exit areas have been selected, vector fields 150 and 160 can be generated as boundary conditions or constraints, respectively on the entrance area 101 and the exit area 135, for a fluid flow simulation, such as solving the incompressible Navier-Stokes equations. Further boundary conditions for the fluid flow simulation include specifying that areas on the surface of the hair volume other than the entrance or exit areas have no fluid flow through them, i.e., $v \cdot n = 0$, where v is the fluid flow vector field in the hair volume, and n is the normal to the hair volume. Another boundary condition that may be applied is the 'no-slip' condition for the fluid velocity, $v \cdot t = 0$, where t is the tangent vector at a point on the surface not in the entrance or exit areas.

Once the initial and/or boundary conditions for the fluid flow simulation have been implemented, a numerical simulation of a fluid flow is produced within the 3D hair volume. The fluid flow simulation may optionally be for steady-state fluid flow, or for a time-varying solution. The results of the fluid flow simulation can include fluid flow lines 170. The fluid flow lines may extend from the entrance points to the exit points. The term fluid flow lines will be used to denote any curve or arc that is tangential at all points to the velocity of the fluid flow. In a time-varying solution the fluid flow lines are considered with respect to a particular time step of the fluid flow simulation. The fluid flow simulation can produce a large number of fluid flow lines. In some embodiments the number of fluid flow lines can be in the tens or hundreds of thousands.

Hair image data can be generated using the data for the fluid flow lines. An individual hair can be modeled as originating in the scalp surface and extending along a fluid flow line. The hair can be modeled as extending all the way to an exit point, or as ending at an interior point. Because a large number of fluid flow lines can be simulated with modern computational methods and processors, image data for a corresponding large number of hairs can be produced.

B. Fluid Flow Simulations

FIG. 1B is a simplified illustration of a fluid flow simulation. Various methods exist for numerically simulating fluid flows; many involve finding numerical solutions for the Navier-Stokes partial differential equations, as will be explained in more detail below. FIG. 1B shows a volume in the shape of a cylindrical frustrum and having three boundary surfaces. The base surface 102 of the frustrum is designated as the surface through which fluid can flow into the frustrum. In this example the side of the cylindrical surface 132 is designated as being impermeable to fluid, and so is a boundary to the fluid flow. The end surface 136 is designated as the surface through which fluid exits the frustrum.

In addition to specifying the boundary conditions on the surfaces of the cylinder, other initial conditions for a fluid flow simulation may also be needed. In this example, an initial vector field 152 is specified on the entrance surface 102. The initial vector field on an entrance surface can be required to have $v(p)\cdot n(p) \geq 0$, where $v(p)$ is the initial vector at the entrance surface point p, and $n(p)$ is the unit normal vector at p, at point on the entrance surface, oriented into the volume. In some embodiments the v is parallel to n so that ultimately hair is simulated as growing straight out from skin or scalp.

Initial and/or boundary values can be specified on the exit area 136, depending on a desired effect. In one embodiment no condition is specified and the exit area is treated as a free surface in the fluid flow simulation. In another embodiment, a Robin boundary condition may be imposed on the exit area 136. One way to specify such a boundary condition is similar to the initial condition on the entrance surface. In this case the condition would be $v(q)\cdot n(q) \leq 0$, where q is a point on the exit area, v is the fluid velocity at q, and n is the unit normal vector at q oriented into the volume. This condition ensures that the fluid flows out of the volume.

Given a complete set of boundary and/or initial values for the fluid, appropriate numerical fluid flow simulation techniques may be used to generate fluid flow data. In one category, grid-based fluid flow simulation techniques use a decomposition of the hair volume into cells or polyhedra and difference approximations for derivatives as part of solving, at least approximately, for the fluid velocity and pressure. As will be explained in more detail below, the fluid flow simulation may be performed by a reduction to solution for the fluid pressure. A second category of fluid flow simulation techniques use particle-based methods such as smoothed particle hydrodynamics (SPH). Other fluid flow simulation techniques exist that allow for generation of fluid flow lines and can be used.

The equations for fluid flow are based on the Navier-Stokes equations, as described in detail below, which reflect the properties of conservation of mass and the conservation of momentum. The equations reduce in complexity when the assumptions of incompressibility and inviscidity are used, as is the case in the exemplary embodiments described herein, though other embodiments may be implemented without these reductions.

The Navier-Stokes equations are partial differential equations involving the variable time. Fluid flow simulations may thus involve a time dependency; that is, the velocity and pressure of the fluid at a point in the volume may change with time. For the case of animation data, a time varying solution may be used: at each time instant of the solution, the fluid flow lines are used to place hair images.

Alternatively, depending on a solver system to be used, a steady state solution may be desired. Determining a steady state solution may allow for faster numerical fluid flow simulation.

C. Hair Simulation

Once the fluid flow simulation data is available, fluid flow lines can be generated from the data, if not already part of the fluid flow simulation data itself. It may be computationally straightforward to generate large numbers of such fluid flow lines.

Given a fluid flow line, image data for a hair extending along the line can be generated. The data can include a thickness, which can be randomly generated, color, transparency, or other properties that affect a rendering of the image itself. Each such simulated hair can extend either the full length of the fluid flow line from entrance to exit, or the hair can be simulated as extending only partially along the fluid flow line. The generation image data for the hairs may use other information, such as intended viewpoint and lighting conditions for the image in determining how many hairs, and which hairs, need to have image data generated. This selection of hairs for image data generation may work interactively with an object rendering system for efficiency. For example, if certain hairs are determined to be hidden behind other hairs, or objects of the image scene, then image data for those hairs need not be generated.

D. Exemplary Method

FIG. 2 is a flow chart of an embodiment of a method 200 to produce image data of hairs extending from an object. As stated above, the term "hair" will denote not just growths of epidermal hair or fur follicles of a human or animal, but also any slender and/or threadlike extensions from an object. FIG. 2 describes an embodiment directed to producing image data for hair on an computer-generated virtual character, but it will be clear to one of skill in the art how the method applies to embodiments for other objects, and for other embodiments of hair as thread-like extensions from an object.

At stage 210, a computing system receives a representation of character, which can be a 3D polyhedra character mesh that comprises a volume for the character. Alternatively, the representation of the character may be a two-dimensional (2D) polygonal character surface mesh for a component of the surface of the character from which it is desired to simulate hair extending. The representation of the character may be implemented in various data appropriate data structures. The representation of the character may also comprise other information such as color and transparency information.

In the case that the representation of the character comprises 3D polyhedral character mesh, surface faces of the polyhedra may be identified for the surface area on the character at which the hair is to be extended, termed herein the hair growth surface area. Data from these surface faces may further be used to produce a 2D mesh to form a tessellation of the hair growth surface area.

At stage 220, once the hair growth surface area is generated, a 3D hair volume is extended from the character mesh. The 3D hair volume may be subdivided to comprise cells or polyhedra, forming a 3D polyhedral hair mesh. The 3D polyhedral hair mesh completely encompasses the 3D hair volume, and is fully closed in the sense that the outer surface faces of the cells or polyhedra cover the 3D hair volume without gaps.

In an exemplary embodiment, with reference to the example in FIG. 1A, the character 100 may be received by a computing system in the form of data for a 3D mesh of cells or polyhedra. The faces of the cells or polyhedra corresponding to the scalp 101 may be, or have been, identified and selected as the hair growth surface area. The 3D hair volume is then extended from the faces to form the 3D hair volume 130. The 3D hair volume can be created using 3D modeling programs. These programs can allow a user to shape and position a volume to match artistic desires.

At stage 230, within the hair growth surface area, an area, termed herein the source area, is defined from which the fluid is to enter the hair volume. This area may comprise unconnected components within the hair growth surface area. For example, in some applications of the method it may be desirable to leave an appearance of an underlying bald spot. In such a case the boundary condition for the fluid flow through the section of the hair growth surface area corresponding to the bald spot can be set to zero. The direction of hair growth can be implemented by the direction and magnitude of the initial vector field for the fluid flow on the hair growth surface area. The source area may defined interactively by a user. In one computer program, the source area is defined by applying virtual paint to the hair growth surface area that is presented on a user interface. Virtual painting may comprise interactively applying markings to an image presented on a visual display. The virtual paint may comprise information both for location and intensity of hair growth. Intensity of the applied virtual paint can designate a desired density of hair growth at the location.

At stage 240, an area on the surface of the 3D hair volume is defined that is to be the area from which the fluid is to exit the 3D hair volume in the fluid flow simulation. The area may comprise separated component areas, and herein is termed the exit area. The exit area may be defined interactively by a user; in one computer program, the exit area is defined by applying virtual paint to the virtual surface of the hair volume, as presented on a user interface.

At stage 250, other boundary conditions needed for a fluid flow simulation are implemented. The fluid flow is then simulated. The data produced by the fluid flow simulation can include the fluid velocity, pressure or other physical data. In some embodiments, the fluid being simulated corresponds to incompressible water at constant temperature.

At stage 260, if the fluid flow simulation does not produce fluid flow lines directly, then the data of the fluid flow simulation data is used to produce the fluid flow lines. Fluid flow lines are curves whose tangent vector at any point is parallel to a velocity vector of the fluid flow at that point. The number of fluid flow lines generated can be determined from a desired hair density. For example, if hair to be imaged is thin but dense hair, then more fluid flow lines can be generated than if the hair was to comprise thick hairs but sparse.

The data produced by the fluid flow simulation can be stored for reuse. For example, if a greater number of hairs are determined to be necessary in an image, the data may be accessed and a larger number of fluid flow lines generated to create an improved image.

At stage 270, image data is created for hair, in which each hair strand image data is such that the hair strand is along a fluid flow line. The image data may also comprise information such as color, luminosity, and thickness for each hair strand. Other information may also be included. Having the hair strands extend along fluid flow lines can eliminate the need to manually enter guide hairs that control the location and appearance of nearby hairs. The physical properties of fluid flow lines, such as non-intersection, may cause the image hair strands to appear natural and with correct behavior with respect to nearby hair strands.

If desired, the image data for selected hair strands can be altered so that the selected hair strands are not confined to a single fluid flow line. Such an alteration can be used to create, for example, the image of fly away hairs, or of static electricity.

The following sections describe detailed exemplary embodiments of how a 3D hair volume is generated with respect to a specified surface, such as a scalp on a computer-generated character in the example just given. Subsequent sections describe details of how embodiments can use fluid flow simulations within 3D hair volumes, and how those fluid flow simulations can be used in the generation image data for hair, fur or other strand-like extensions from a part of a surface of an object.

II. Object Surfaces And Three-Dimensional Hair Volumes

This section describes details of operations related to generating a hair growth surface areas and 3D hair volumes as used in some embodiments. In some embodiments these operations can be performed by a user, whereas in additional and/or alternative embodiments the results of the operations may be received as inputs to methods or systems.

A. Character Meshes and Object Surfaces

Characters in animations can be represented in computer graphics, in some implementations, as a 3D grid of polyhedra; for example, as cells (curvilinear forms of parallelepipeds) or tetrahedra. Alternatively, virtual characters may be initially implemented using just the surface of a character, implemented as 2D surface mesh in the 3D world space. In the former case, the faces of the polyhedra that do not abut other polyhedral faces form a surface of the character. The data of the surface faces, e.g., the coordinates in space of the vertices, can be extracted to form a 2D tessellated surface mesh in a 3D world space, termed a polygonal character surface mesh.

Figure 3B:
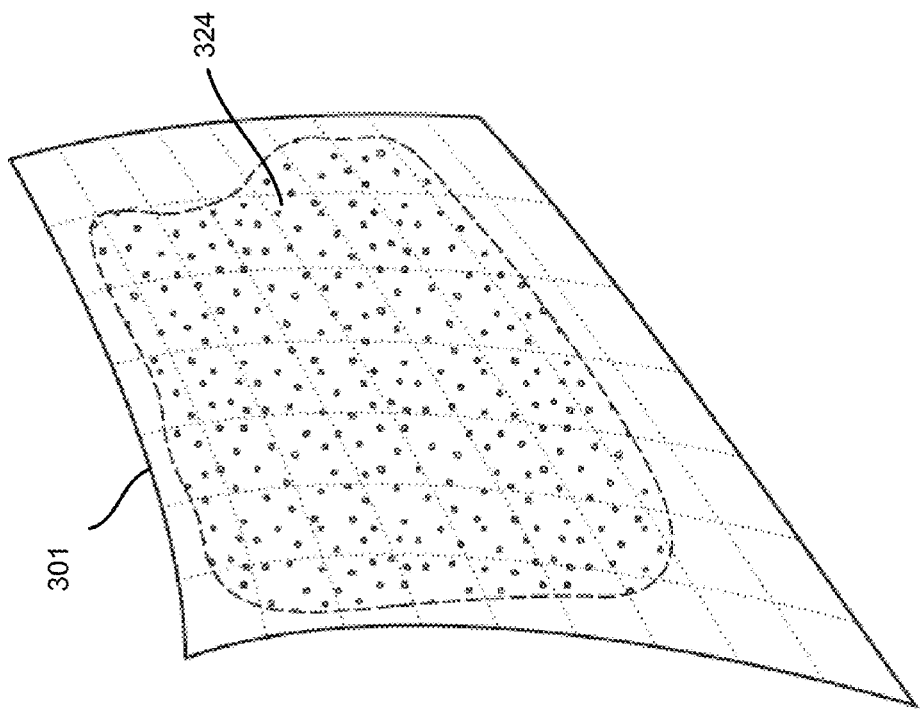
FIG. 3B illustrates a rendering of a tessellated surface component of an object comprising a source area from which hair growth is to be simulated, according to an embodiment.
Figure 3A:
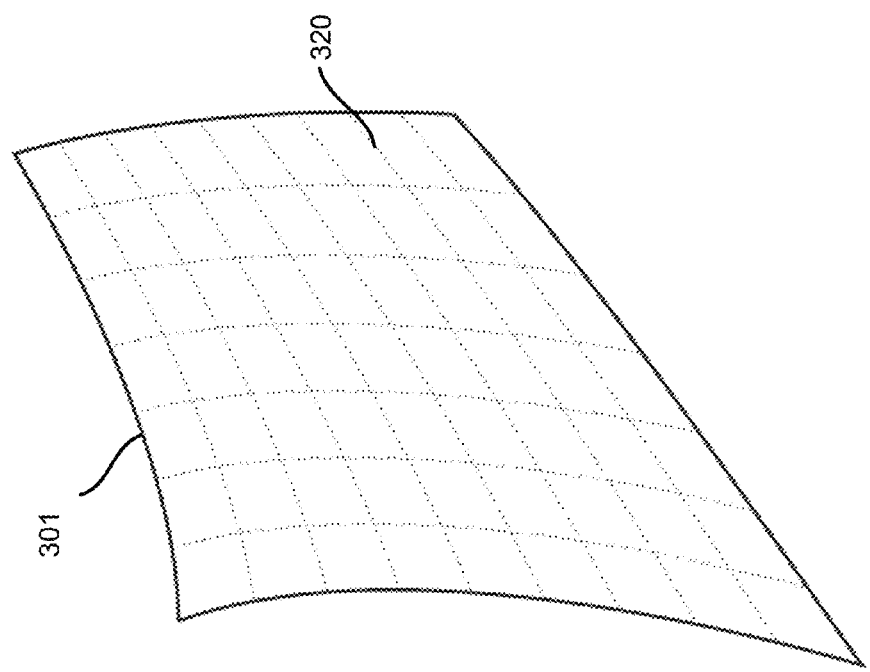
FIG. 3A illustrates a tessellated surface component of an object, according to an embodiment.

FIG. 3A illustrates a component 301 of surface faces on a polygonal character surface mesh, simplified for explanatory purposes. The surface faces 301 are presumed to be part of a character that has been selected as a hair growth surface area on the character, e.g. a scalp. The tessellation 320 may be taken from the character mesh, or alternatively, the tessellation may be produced by subdividing the surface faces of the polygonal character surface mesh.

FIG. 3B illustrates the tessellated surface component 301 in which a source area 324 for hair growth is selected. The source area may be part of the received polygonal character surface mesh data, or may be received through a user interface, in which a user views the surface mesh 301, and interactively applies a virtual paint, for example, with a mouse or stylus. The virtual paint can input data for the polygonal character surface mesh for at least the location and intensity of the hair to be simulated. In areas in which more virtual paint is applied, a denser set of hair growth seeds can be generated, as explained below, for some embodiments.

Figure 3C:
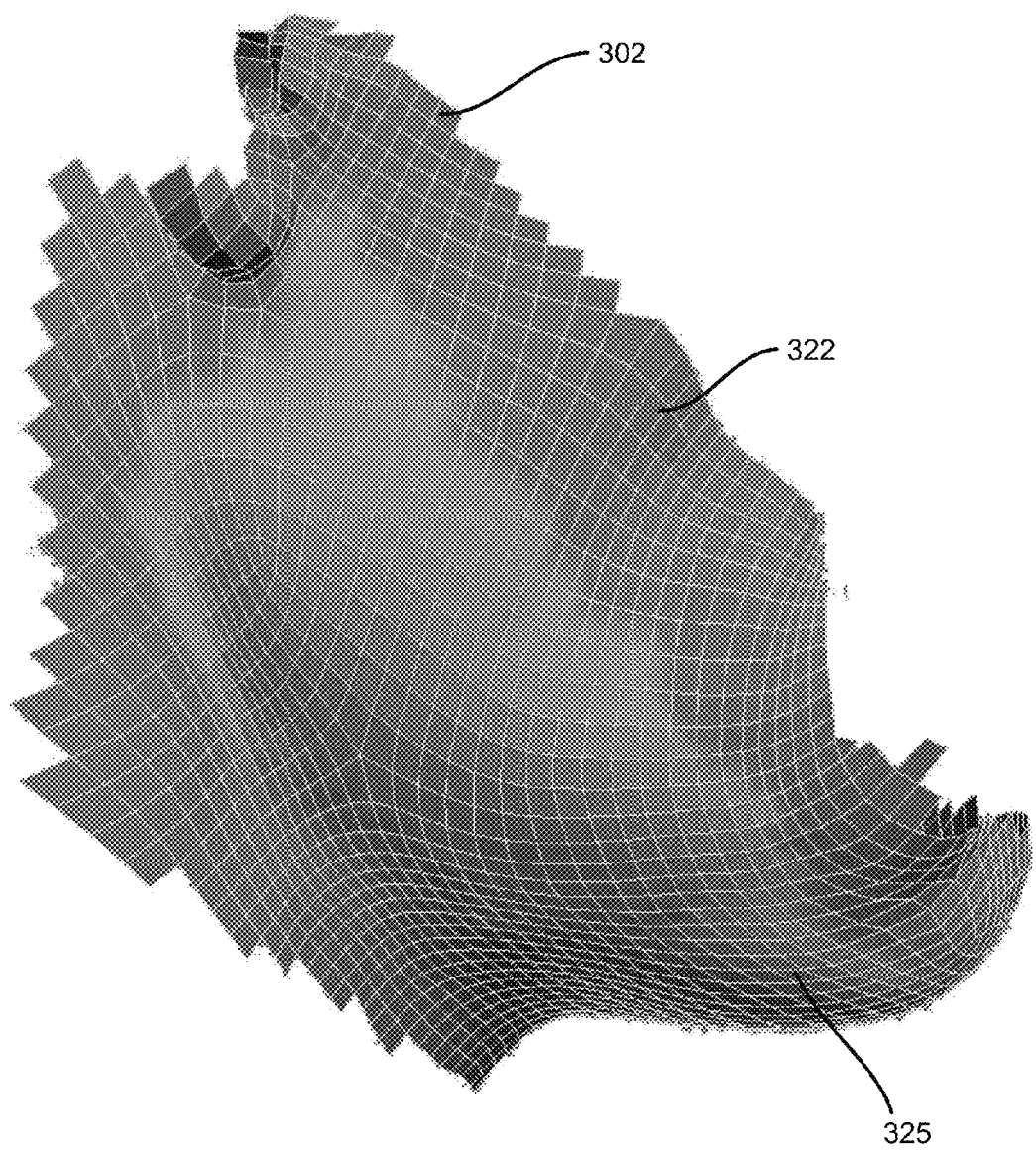
FIG. 3C shows a rendering of a tessellated surface component of an object comprising a source area, according to an embodiment.

FIG. 3C shows an example of a computer rendering of a part of a polygonal character surface mesh 302; in this case, the underside of a character's chin. The polygonal character surface mesh comprises the tessellation 322. A region of the polygonal character surface mesh 325 is shown painted to select it as a source area.

B. 3D Hair Volumes

As discussed in relation to stage 220 of FIG. 2, a 3D hair volume can be generated in which hair for the character is to be simulated. The 3D hair volume can have the hair growth area on the character mesh as one of its surfaces. The 3D hair volume can be generated by appropriate methods and/or application software, e.g., 3D modeling or constructive solid geometry (CSG). The 3D hair volume can be implemented as a 3D grid of cells or polyhedra in a virtual 3D world space, herein termed a 3D polyhedral hair mesh. The 3D polyhedral hair mesh can be formed as a 3D extension from the polygonal character surface mesh.

In some embodiments, the 3D hair mesh can be created by generating a 3D rectangular grid of cells (parallelepipeds)

with respect to the world space, and intersecting the 3D rectangular grid with the character mesh. Only those rectangular cells determined to be exterior to the character are kept as part of the 3D hair volume.

Interactive user interface tools, e.g. ZBrush, can then be used to shape the remaining 3D rectangular grid into a desired shape for the 3D polyhedral hair mesh. In this process, the polygonal character surface mesh can automatically become one of the surfaces of the 3D polyhedral hair mesh.

Figure 4A:
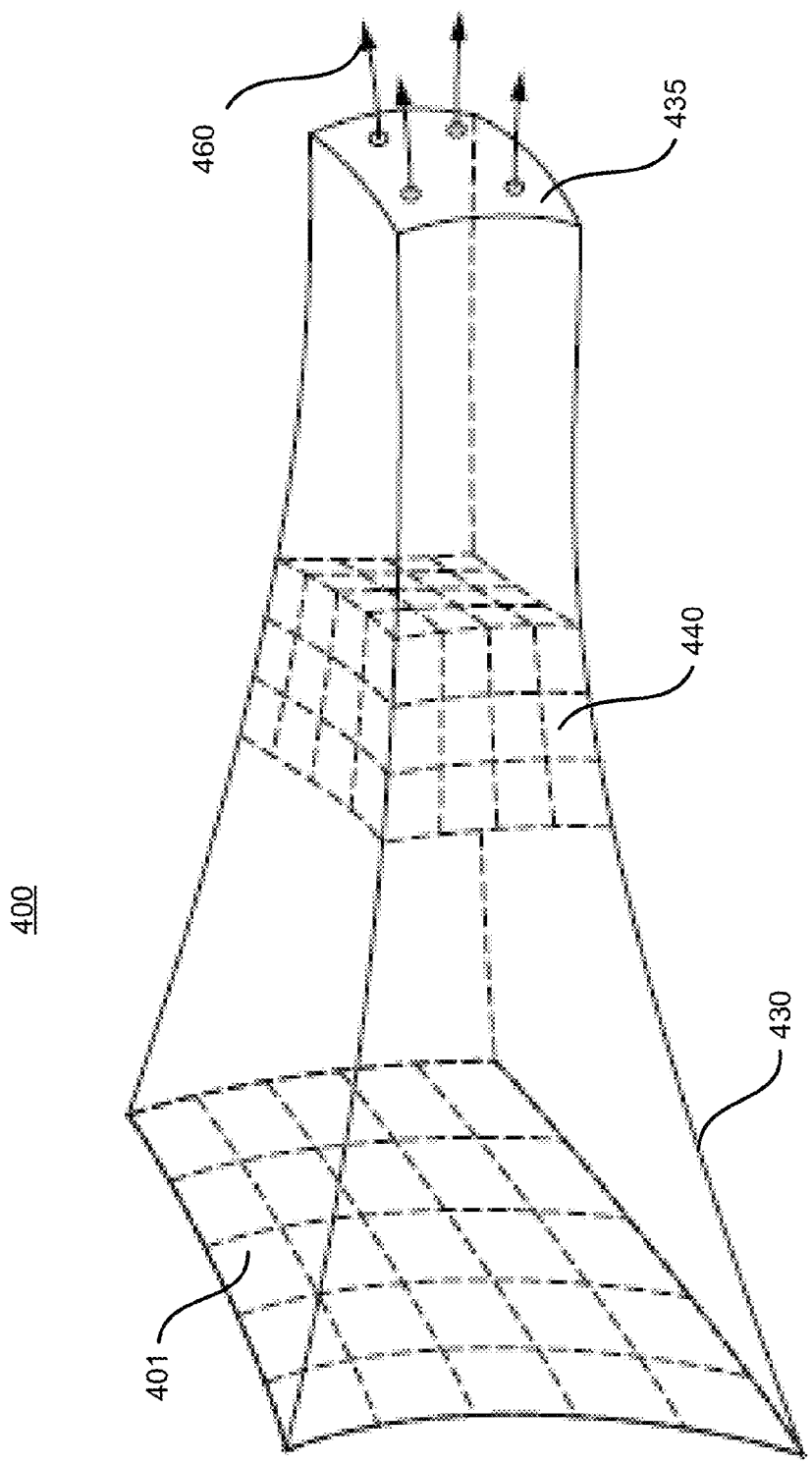
FIG. 4A illustrates a three-dimensional (3D) hair volume and components of a fully-closed polyhedral hair mesh that subdivides the 3D hair volume, according to embodiments.

FIG. 4A illustrates a simplified version of a 3D polyhedral hair mesh subdividing a 3D hair volume 400. The left surface 401 can be generated as above and may interface with the polygonal character surface mesh for the hair growth area. In embodiments the left surface 401 is conformed to the polygonal character surface mesh.

Extending from the surface 401 is a 3D grid of cells 440. For simplicity the cells 440 are shown only subdividing part of the whole 3D hair volume 400, but it is to be understood that in this example the whole 3D hair volume is subdivided. The 3D hair volume comprises other surfaces 430 and 435. The surface 435 is selected as an exit area for the 3D hair volume from which the fluid in a fluid simulation is to exit. The side surfaces 430 are selected as boundary surfaces, through which fluid neither enters nor exits during a fluid simulation. A 3D polyhedral hair mesh can be generated so as to have a fully closed surface, in that the surface of the 3D hair volume is completely covered by surface faces of the cells or polyhedra of the 3D polyhedral hair mesh 440.

As described below, during the fluid flow simulation within the 3D hair volume, depending on the numerical processes used, it may be that the 3D polyhedral hair mesh is refined by the simulation process. Certain of the 3D cells or polyhedra may be subdivided to keep a desired accuracy of the simulation.

Figure 4B:
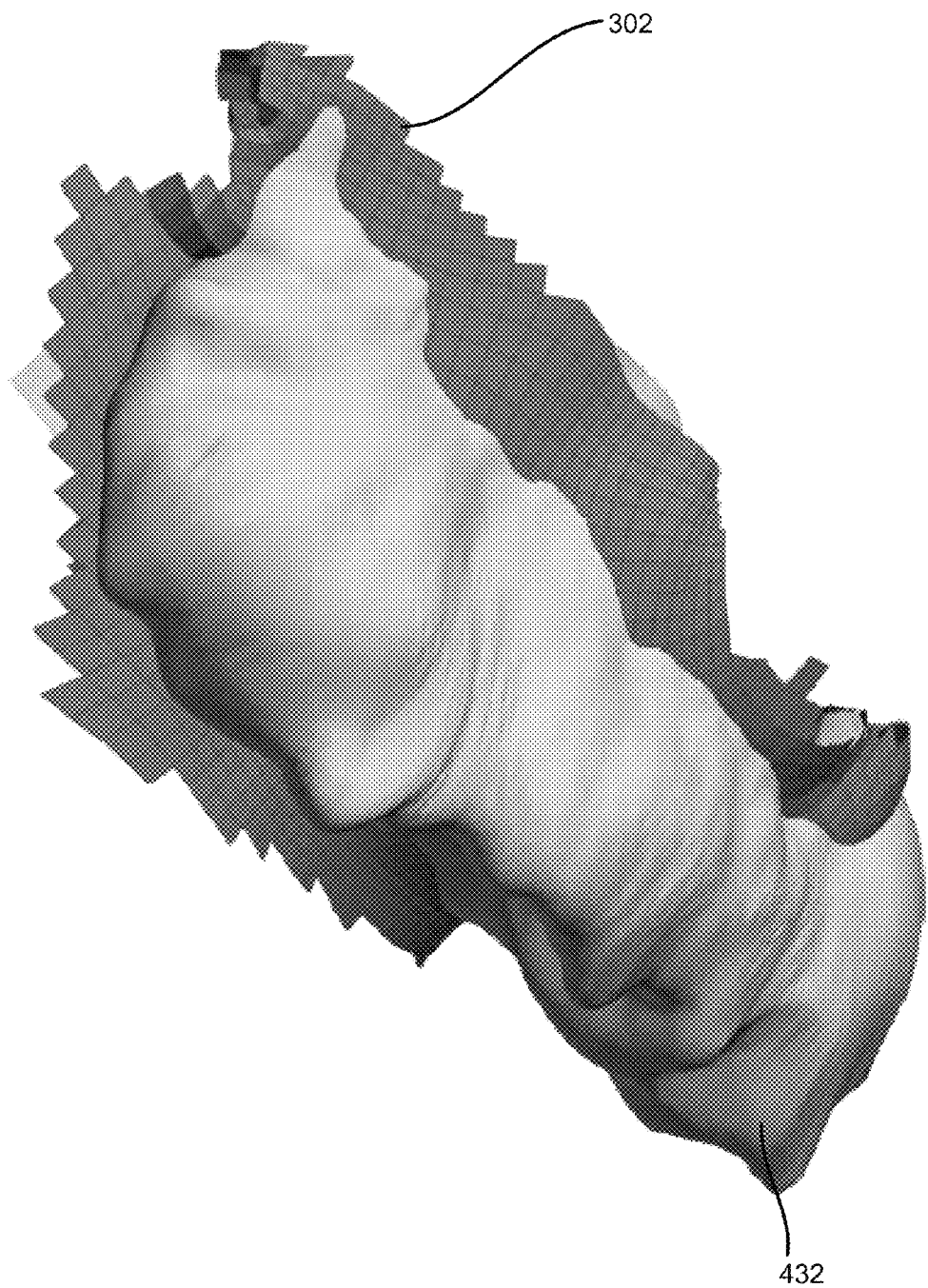
FIG. 4B shows a rendering of a view of a tessellated surface of an object from which a 3D hair volume is extended, according to an embodiment.

FIG. 4B shows an example of a computer textured rendering of the outer surface 432 of a 3D hair volume. This example relates to the computer rendering of FIG. 3C, in that the character mesh 302 is from a chin of an animated character. The polygonal character surface mesh 302 forms a surface for the 3D hair volume. The 3D cells are not shown but are interposed between the character mesh 302 and the outer surface 432.

III. Fluid Flow Simulations

Once the 3D polyhedral hair mesh has been generated, further steps may be taken in preparation for a fluid flow simulation, as discussed in relation to stages 230 and 240 of FIG. 2. These stages involve defining areas or points on the surface of the 3D polyhedral hair mesh for fluid entrance or fluid exit. They correspond to setting initial and/or boundary values for partial differential equations governing fluid flow, as now described.

A. Incompressible Navier-Stokes Equations

In general, a simulation of a fluid flow in a volume produces time-varying functions for a velocity v(x,t) and a pressure p(x,t) of the fluid at a point x in a volume, at a time t. The equations connecting v and p are based on physical laws, and are usually modeled using the Navier-Stokes equations.

A form of the Navier-Stokes (NS) equations in the case of incompressible fluids (e.g., water at room temperature and pressure) is given by equations (1A) and (1B): and $$\rho\left(\frac{\partial v}{\partial t} + v \cdot \nabla v\right) = -\nabla p + \mu \nabla^2 v + f, \quad (1A)$$

and $$\nabla \cdot v = 0, \quad (1B)$$

in which v is the fluid velocity, ρ is the fluid density, p is the fluid pressure, μ is the viscosity, and f comprises the external applied forces. The left hand side of equation (1A) expresses the inertia of the fluid. The terms on the right hand side of (1A) express, from left to right, the pressure gradient, the viscosity, and the applied external forces. This equation expresses the physical law of conservation of momentum. Equation (1B) is the conservation of mass, expressed in differential form.

While equations (1A) and (1B) are simplifications of more general forms of the physical laws for fluid dynamics, they apply to many important cases, and are the form applied in some embodiments. The incompressibility condition may be appropriate in some embodiments to reflect that case that hair typically does not compress. It will apparent to one of skill in the art that embodiments of the methods and systems may use solution methods applied to more general forms of the Navier-Stokes equations if such methods and systems are found to produce a desired image effect.

Some embodiments may use further simplifications of equations (1A) and (1B). For example, some embodiments may involve finding steady-state solutions for v and p, in which v and p do not change with time. In another example, some embodiments apply the NS equations under the additional assumption that the fluid is non-viscous, in which case the second term on the right in (1A) vanishes.

To use equation (1A) the external forces f must be specified. In applications of embodiments to generating images of actual hair of an object in air, one component off may be the force of gravity. In another example, in applications of embodiments to generating images of underwater sea grass, the external force may be a buoyancy force. Alternatively, no external force may be applied and the corresponding fluid flow simulation is controlled at least through applied boundary conditions to achieve artistically desirable results.

B. Applying Boundary and Initial Values

Numerical simulation of fluid flow equations are performed with respect to a specified 3D hair volume and with specified boundary and/or initial conditions on the volume. Initial values specify values for either of v or p, or their derivatives, at a start time $t_0$ at particular locations in the volume or on its surface. Boundary values specify values of v or p, or their derivatives, at points or areas on the surface of the volume over the time period of the fluid flow simulation. The term boundary condition is used herein to denote either an initial value or a boundary value.

Figure 5:
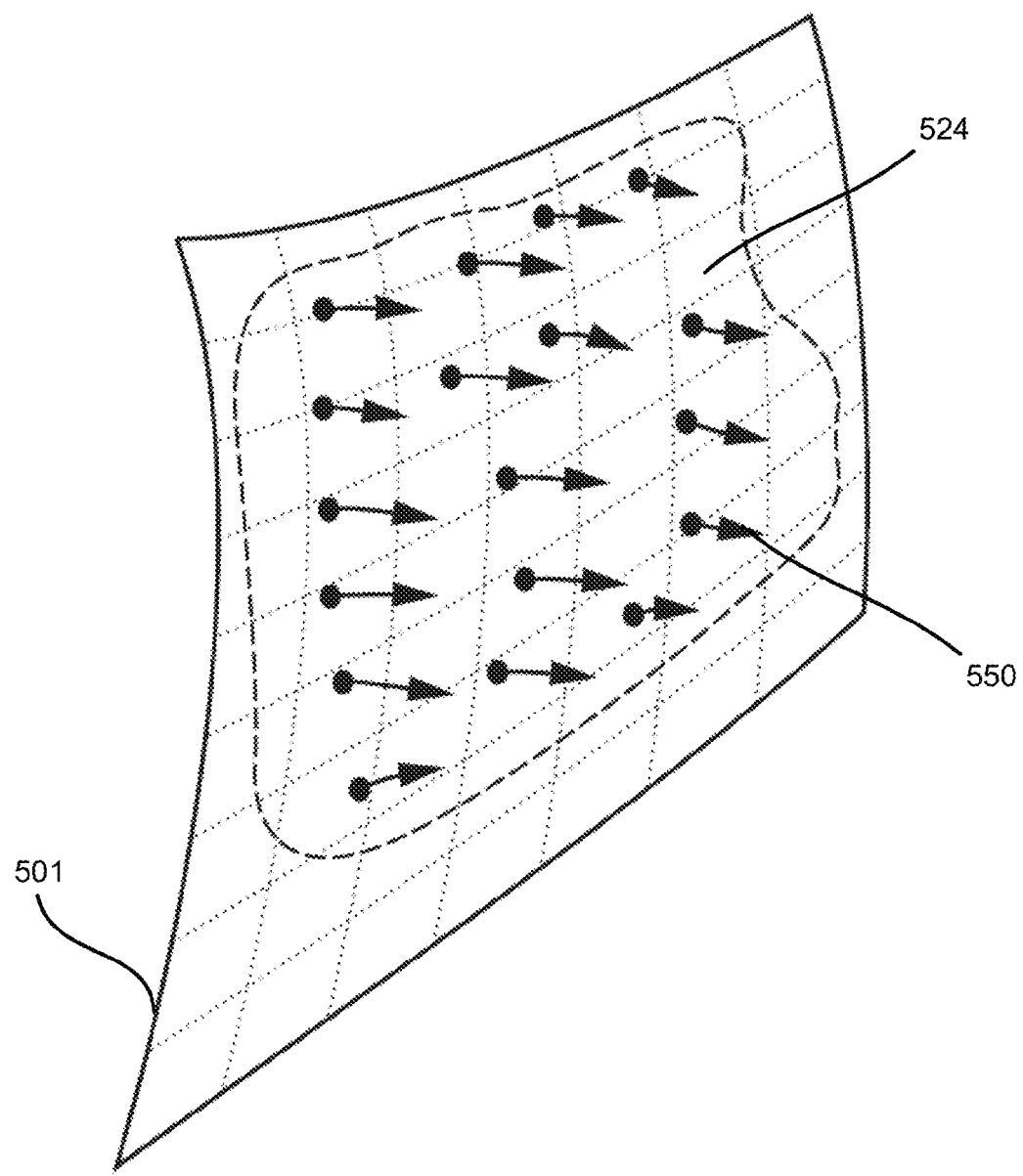
FIG. 5 illustrates a tessellated surface component of an object with entry flow vectors, according to an embodiment.

FIG. 5 shows, in simplified form, the specification of a boundary condition for a 3D hair volume. The tessellated surface 501 forms a hair growth area of the character mesh, and is assumed to be a surface for 3D hair mesh extended from the polygonal character surface mesh. A source area 524 has been determined from which it is desired to form an image of hair extending. Remaining areas of the surface 501 not included in source area 524 may be intended to make the image show bald spots, for example.

FIG. 5 shows a specification of a boundary condition for the fluid velocity v as it enters the 3D hair volume. In one embodiment the boundary condition may be specified as a function for a vector field in the source area 524. In another embodiment, the boundary condition may specify values 550 of v at selected points in the source area. The magnitude and direction of v specifies the speed and direction of the fluid entering the 3D hair volume.

In some embodiments locations for fluid entry points, for example, as shown by solid dots on the surface 501 in FIG. 5, may have a density that varies across the source area. The density may be based on a desired density of hairs (e.g., the number of hairs per square centimeter) in an image. In further embodiments, the density of fluid entry points in subregions of the source area may be based on a probability distribution function. Non-limiting examples of such probability distribution functions include Gaussian, Poisson and Cauchy distributions. In embodiments in which the source area is specified by applying a virtual paint to the character mesh, the intensity of the virtual paint may be used to generate density values for the fluid entry points.

In some embodiments the boundary condition for the values 550 of v on the surface 501 can be entered interactively. The values of v need not be normal to the surface; for instance, certain fluid entry vectors v can have components tangential to the surface 501 in order to simulate swirls or waves in the hair.

C. Solution Methods

In full generality, the Navier-Stokes equations with boundary conditions are difficult to solve due to the nonlinearity and the coupling between the velocity and pressure. Fortunately a number of methods exist to produce fluid flow simulations efficiently. Grid-based methods include reduction to a Poisson equation for the pressure, and vortex-stream function methods. Still other methods use particle based approaches, e.g. simulated particle hydrodynamics.

Embodiments may be implemented using any of the available solution methods that yields solution data from which fluid flow lines can be generated. The choice of solver can be based on the computational resources available, whether a time-dependent or a steady-state solution is sought, or other considerations.

Figure 6A:
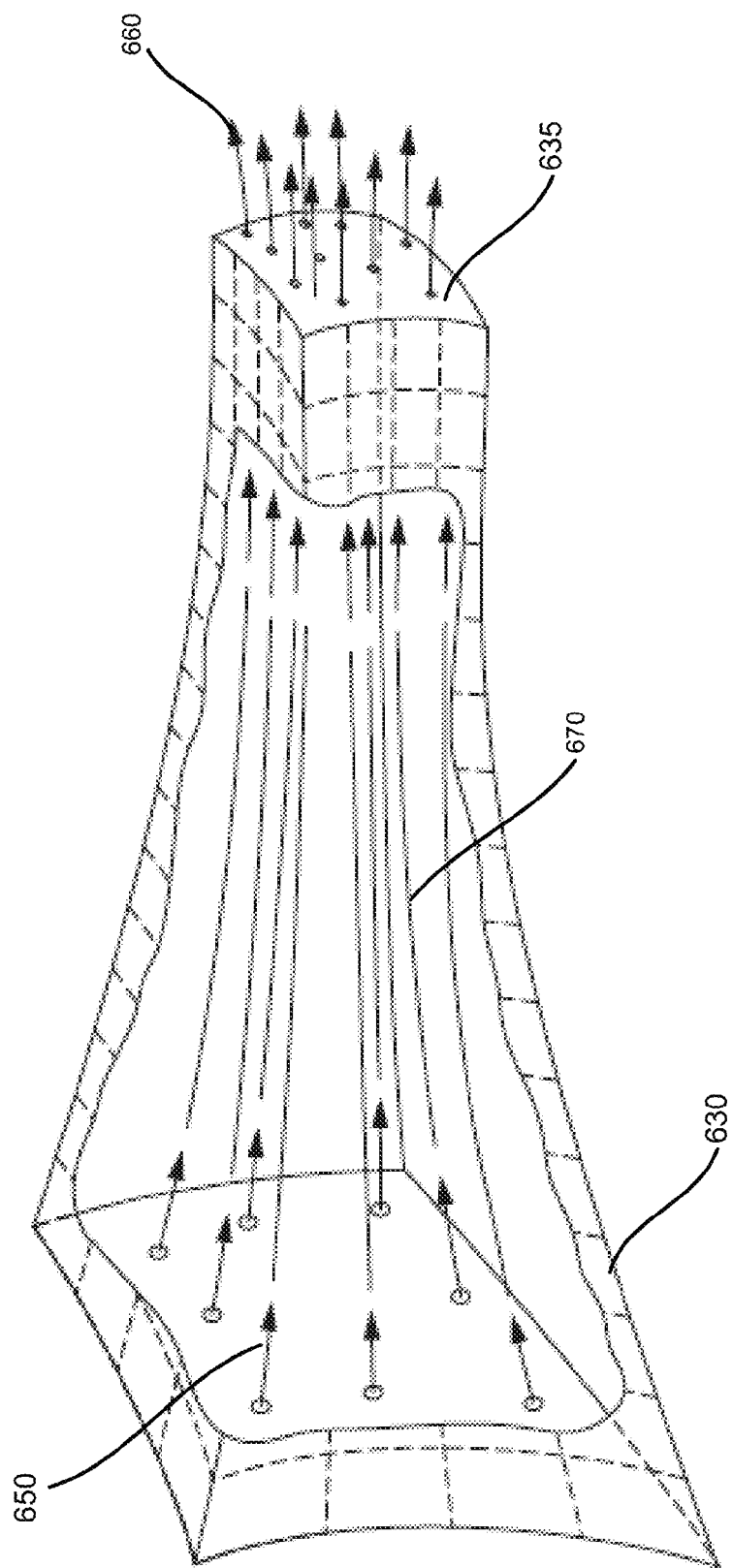
FIG. 6A illustrate a cut-away view of a 3D hair volume with simulated fluid flow lines extending from a source area to an exit area, according to an embodiment.

FIG. 6A shows in simplified form a result of a fluid flow simulation for a 3D polyhedral hair mesh similar to that shown in FIG. 4A. The side surfaces 630 of the 3D hair mesh are shown in a cut-away view. Boundary conditions for the fluid entry vectors 650 have been applied to an entrance surface of the 3D hair mesh. Boundary conditions for the fluid exit vectors 660 have been applied to an exit area 635. The side surfaces 630 have boundary conditions that v·n=0, where v is the fluid velocity and n is the unit normal vector to the side surface i.e., there is no fluid flow either in or out through the side surfaces 630.

FIG. 6A shows fluid flow lines 670 extending from the entrance area to the exit area 635. One physical property of fluid flow lines is that they do not intersect, unless there is no fluid flow. Application of realistic boundary conditions may assure that degenerate solutions do not occur.

Figure 6B:
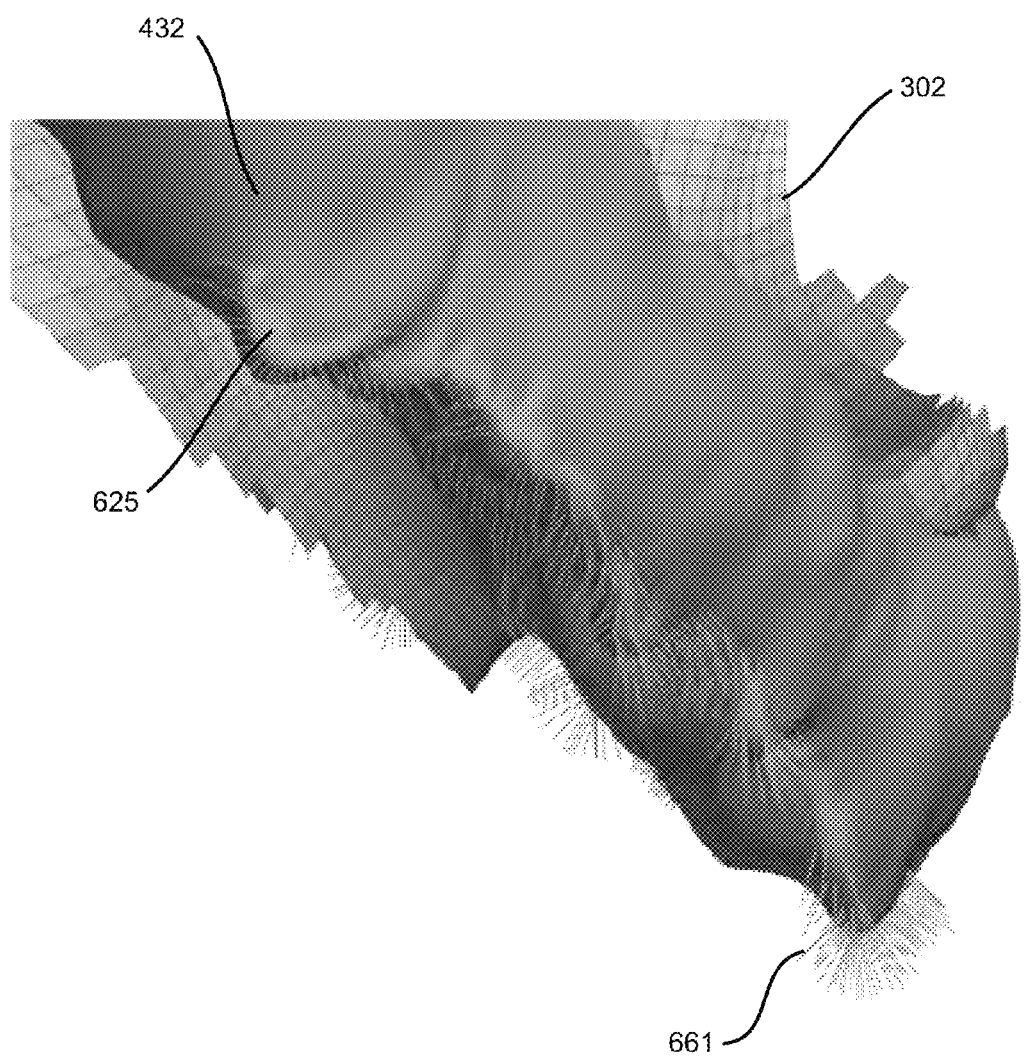
FIG. 6B shows a rendering of exit flow vectors on a 3D hair volume, according to an embodiment.

FIG. 6B shows a computer rendering of the polygonal character surface mesh 302 of FIG. 3C together with the 3D polyhedral hair mesh 432 discussed in relation to FIG. 4B. Part of the 3D hair mesh 432 has had an exit area for a fluid flow simulation designated by an application of virtual paint to the region 625 of the 3D hair mesh. The applied virtual paint can be used to generate exit vectors 661 for the fluid flow simulation.

Figure 6C:
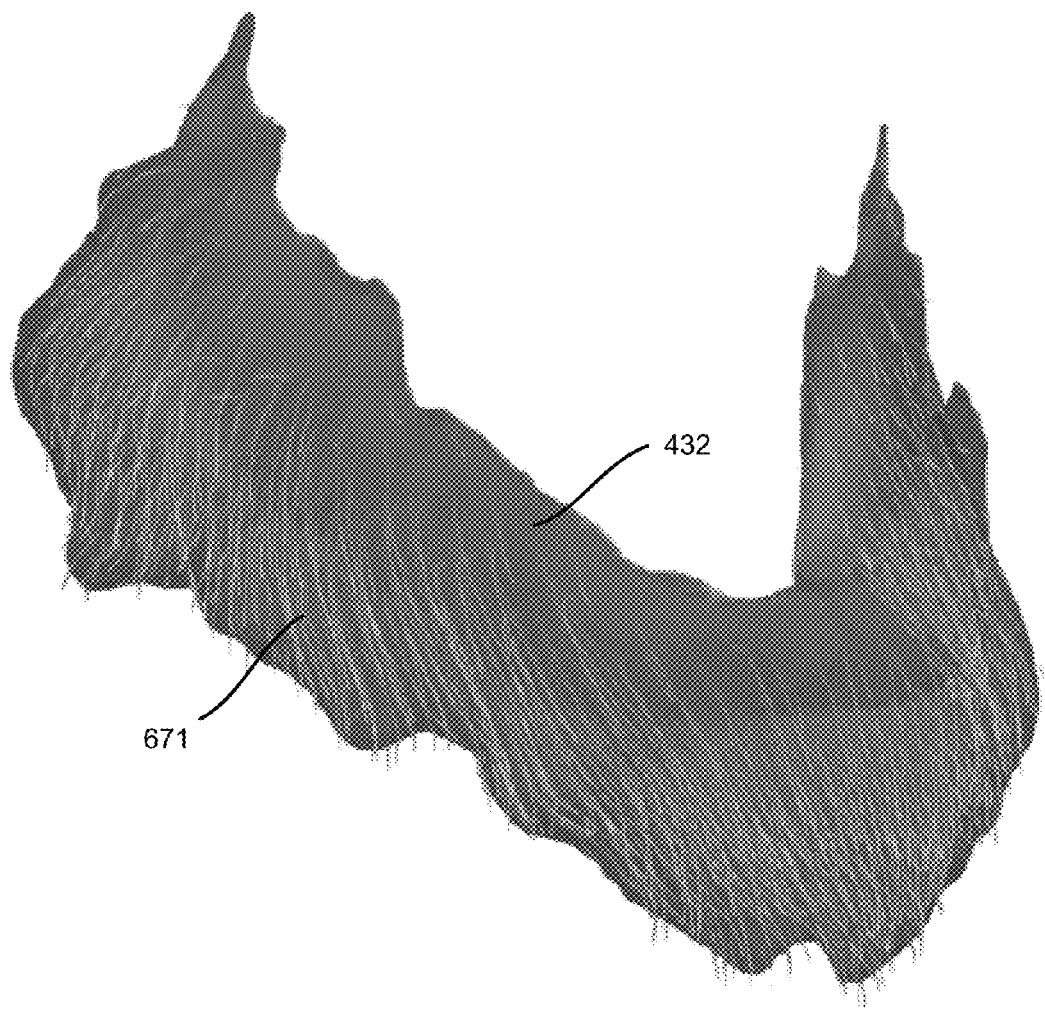
FIG. 6C shows a rendering of simulated fluid flow lines in a 3D hair volume, according to an embodiment.

FIG. 6C shows a computer rendering of the 3D polyhedral hair mesh 432 of FIG. 4B, shown translucently to view the fluid flow lines 671. The fluid flow lines extend to the exit vectors 661 shown in FIG. 6B.

IV. Simulating Hair

Given a 3D hair volume in which a fluid flow simulation has been generated, and in which fluid flow lines have been generated, image data for hairs on the original character can be generated, according to embodiments. Image data is generated in which hair strands follow the fluid flow lines. The image data for the hairs can be generated to comprise further information regarding the hair strands, as discussed previously in relation to stage 270 of FIG. 2.

The number of hairs desired for an image can be used as an input for the fluid flow simulation to determine boundary conditions, for example, the number of fluid entry points. The image data for the hairs can show the hairs ending at the location of the exit area of the 3D hair volume. Alternatively, some of the hair images can be shown extending along fluid flow lines without continuing to the exit area, for instance, to depict two or more hair lengths.

V. Further Embodiments

A. Alternative Method

Figure 7:
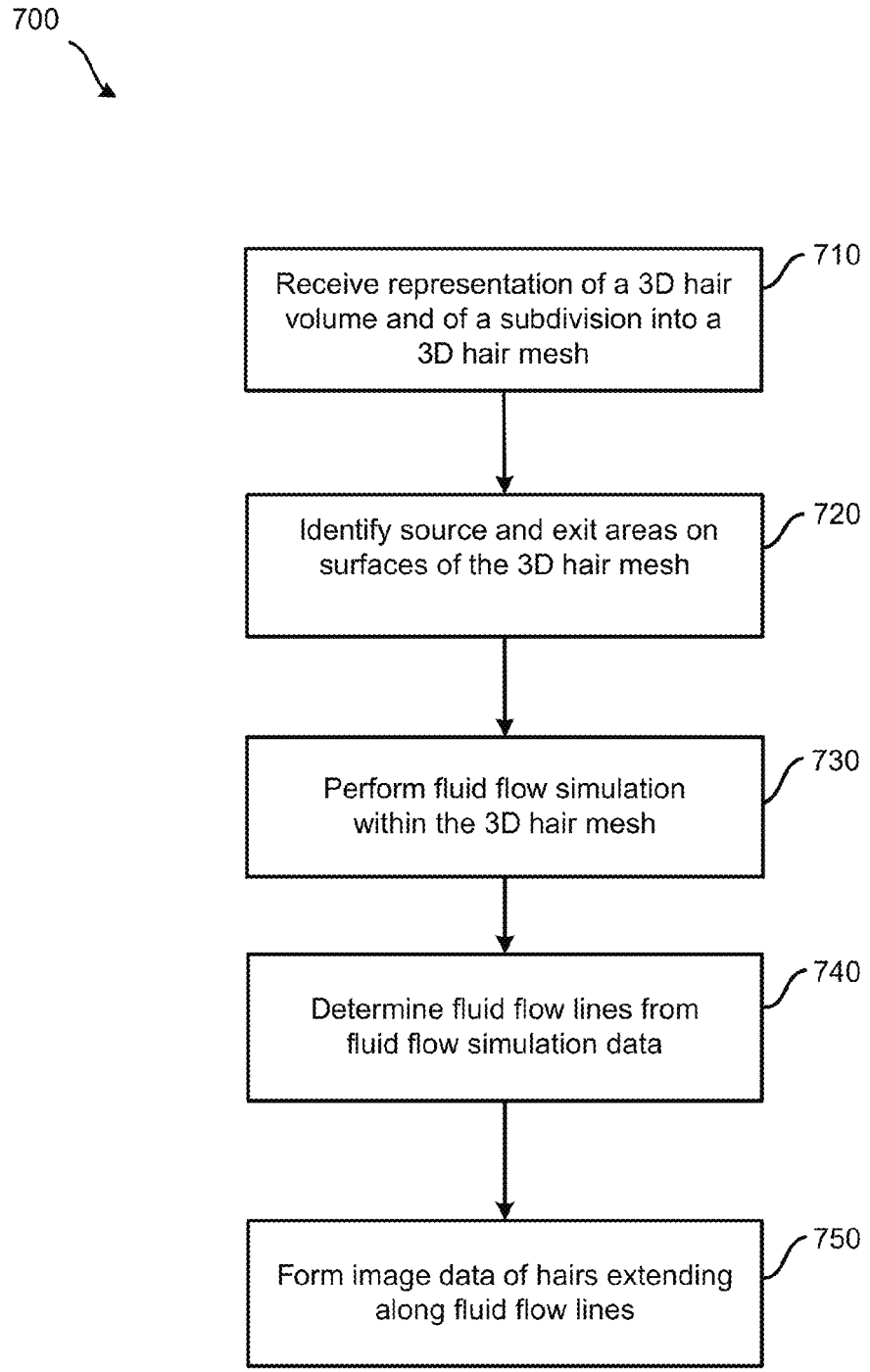
FIG. 7 is a flow chart for a method of generating image data comprising hair or fur, according to an embodiment.

FIG. 7 is a flowchart of a method 700 that can be used to generate image data for hairs in an image, according to an embodiment. The method may be used by one or more computing systems, for example, parallel computing systems to generate multiple images concurrently.

At stage 710 a representation of a 3D hair volume is received in a computing system. Also received is information for a subdivision of the 3D hair volume as a fully closed 3D polyhedral hair mesh, as described above. The 3D hair volume representation and/or the 3D polyhedral hair mesh information may have been previously generated by a separate system.

At stage 720. at least one source area and at least one exit area on the surface of the 3D polyhedral hair mesh are identified. The source area and/or the exit area may have been previously selected and are received as inputs in an embodiment. In alternative embodiments, the source area and the exit area are generated interactively by a user through a user interface.

At stage 730, the received information is used to establish boundary conditions on the 3D hair mesh to prepare a fluid flow simulation. Thereafter the fluid flow simulation is performed using an appropriate solution process, as discussed above.

At stage 740, the data of the fluid flow simulation is used to determine fluid flow lines. The number of fluid flow lines may be preselected before the simulation, or may be altered after the simulation to reflect an artistic or other needs.

At stage 750, image data of hair strands is formed from the fluid flow simulation data. The hair strands are configured to lie along fluid flow lines, as discussed above.

In additional and/or alternative embodiments, after formation of the hair image data is formed, it may be modified. In one such embodiment, hairs may be selected interactively, and then caused to lie off of a fluid flow line. This allows for artistic effects such as a fly-away hairs, or other effects.

B. Animation

Embodiments discussed above can be used to generate animations in various ways. A first of such methods is to use a time-varying fluid flow simulation, with the image data for a frame derived from the fluid flow data at a particular time instant. A second of such methods is to use separate 3D hair volumes for different frames.

In the first method, if a character on which hair is to simulated does not vary much over several frames of an animation, the character mesh with its hair growth surface area also may not change much over the frames. To simulate an effect such as wind in a character's hair, a time-dependent fluid flow simulation can be produced. At each time step of the fluid flow simulation, the fluid flow lines for that time step can be found, and hair image data generated in which the hair strands lie along the fluid flow lines. As the fluid flow lines may be different in the next time step of the simulation, the result can be an animation of hair on the character in which the hair varies between frames.

In an additional and/or alternative embodiment, a time-varying fluid flow simulation can be implemented by specifying time-varying fluid velocity vectors as the entrance vectors. This may be used to animate a wave moving through the hair of the character.

An alternative method for creating animation images according to embodiments is to iterate a method such as that of FIG. 2 or FIG. 7 for each frame of the animation. This allows for changing the 3D hair volume between frames. This method also can allow for the 3D hair mesh to change between frames, as the 3D hair mesh can be modified between frames to reflect changed inputs, such as changes in boundary conditions or external forces, or artistic inputs.

VI. Computer Implementations

Figure 8:
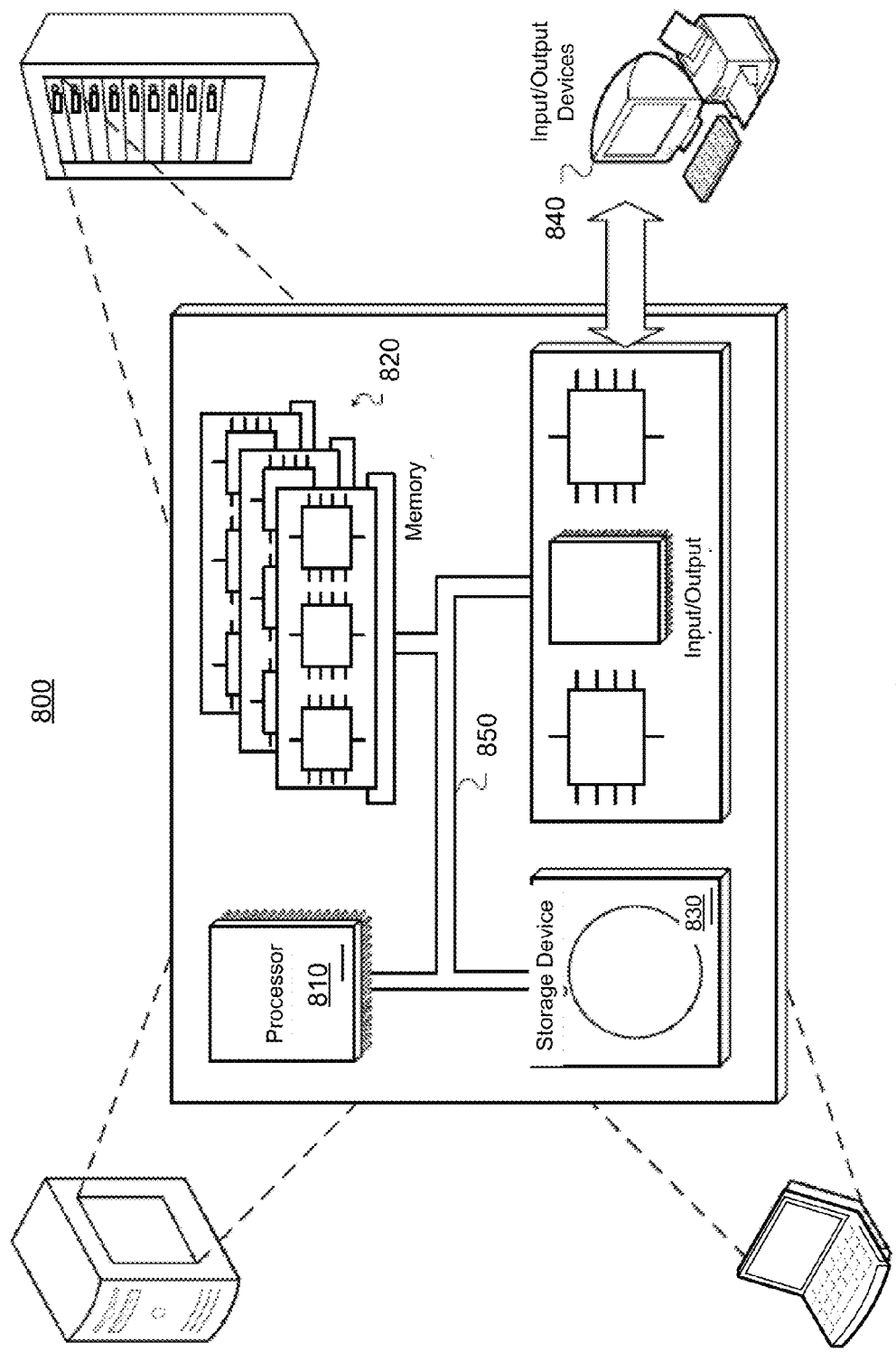
FIG. 8 is a block diagram of a computing system.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes at least one of a keyboard, a pointing device such as a mouse or stylus, or a trackball, by which the user can provide input to the computer. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard, a touchpad, or a pointing device such as a mouse, stylus, or a trackball, by which the user can provide input to the computer. Other display devices and/or other input devices may be used.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

CONCLUSION

A number of embodiments have been described. As will be understood by those skilled in the art, the present invention may be embodied in other specific forms without departing from the essential characteristics thereof. Those skilled in the art will recognize, or be able to ascertain using no more than routine experimentation, many equivalents to the specific embodiments of the invention described herein. Such equivalents are intended to be encompassed by the following claims.

What is claimed is:

1. A method of generating image data for hair on a character, the character having a surface component represented by a two-dimensional (2D) polygonal character surface mesh within a three-dimensional (3D) space, the method comprising:
    adding a fully closed 3D polyhedral hair mesh to the 2D polygonal character surface mesh, the fully closed polyhedral 3D hair mesh including a surface comprising a source area at the interface between the 2D polygonal mesh and the fully closed 3D polyhedral hair mesh, one or more exit areas disjoint from the source area, and one or more boundary surfaces between the source area and the one or more exit areas;
    defining a plurality of fluid entrance points along the source area;
    defining a plurality of fluid exit points along the one or more exit areas;
    generating a plurality of fluid flow lines through the fully closed 3D polyhedral hair mesh by simulating a flow of fluid through the fully closed 3D polyhedral hair mesh from the plurality of fluid entrance points to the plurality of fluid exit points, wherein the flow of fluid is bounded within the fully closed 3D polyhedral hair mesh by the one or more boundary surfaces;
    determining a subset of the plurality of fluid flow lines that are visible from a viewpoint; and
    forming image data for a plurality of hairs, wherein each of the plurality of hairs extends along a respective fluid flow line from the subset of the plurality of fluid flow lines.

2. The method of claim 1, wherein adding a fully closed 3D polyhedral hair mesh to the 2D polygonal character surface mesh comprises:
    forming a surface 2D polygonal hair mesh on the surface of the fully closed 3D polyhedral hair mesh that conforms to the 2D polygonal character surface mesh; and
    attaching the surface 2D polygonal hair mesh to the 2D polygonal character surface mesh and forming the source area at the interface between the surface 2D polygonal mesh and the fully closed 3D polyhedral hair mesh.

3. The method of claim 2, wherein 3D modeling techniques are used to form the fully closed 3D polyhedral hair mesh.

4. The method of claim 1, wherein defining the plurality of fluid entrance points includes interactively designating locations or intensity of hair growth to an area in a representation of the source area.

5. The method of claim 1, wherein the fully closed 3D polyhedral hair mesh is alterable through a user interface.

6. The method of claim 5, further comprising generating image data for a plurality of frames in an animation sequence by:
    using a first fully closed 3D polyhedral hair mesh to form image data for the plurality of hairs in a first frame; and
    using a second fully closed 3D polyhedral hair mesh to form image data for the plurality of hairs in a second frame.

7. The method of claim 1, wherein a subset of the plurality of hairs is selected and the image data for the selected hairs in the subset is modified so that each of the selected hairs does not lie along a fluid flow line.

8. The method of claim 1, wherein forming image data for the plurality of hairs further comprises specifying at least one of thickness, color, translucency, and weight for at least one hair.

9. A method of generating image data of hair in a three-dimensional (3D) hair volume comprising:
    receiving a representation of the 3D hair volume, the representation comprising a fully-closed three-dimensional (3D) polyhedral hair mesh of the 3D hair volume, wherein a first surface region of the 3D hair volume conforms to a surface component of the object;
    identifying a part of the first surface region as a source area;
    identifying a second surface region of the 3D hair volume, disjoint from the first surface region, as an exit area;
    simulating a fluid flow within the 3D hair volume using the 3D polyhedral hair mesh such that in the fluid flow simulation the fluid enters the 3D hair volume only through the source area, the fluid exits the hair volume only through the exit area, and the fluid flow is bounded in the 3D hair volume;
    generating a plurality of fluid flow lines through the 3D hair mesh using data of the fluid flow simulation;
    determining a subset of the plurality of fluid flow lines that are visible from a viewpoint; and
    forming image data for a plurality of hairs so that each of the plurality of hairs extends along a respective fluid flow line from the subset of the plurality of fluid flow lines.

10. The method of claim 9, wherein fluid source values used by the fluid flow simulation are specified on the source area as vectors directed into the 3D hair volume.

11. The method of claim 10, wherein the fluid source values are specified according to a probability distribution for a hair root density.

12. The method of claim 10, wherein at least one of the vectors specified on the source area comprises a tangential component that is orthogonal to the normal vector to the source area at the point at which the at least one of the vectors is positioned.

13. The method of claim 9, wherein forming image data for the plurality of hairs further comprises specifying at least one of thickness, color, translucency, and weight for at least one hair.

14. The method of claim 9, wherein at least one of the plurality of hairs is selected and the image data for the at least one selected hair is modified as not to lie along a fluid flow line.

15. The method of claim 9, further comprising generating image data for a plurality of frames in an animation sequence by:
    obtaining a time-varying solution as the fluid flow simulation;
    correlating each frame of the plurality of frames with a respective time value of the time-varying solution; and
    for each of the plurality of frames, forming image data for the plurality of hairs in the frame so that at least one of the plurality of hairs extends along a respective fluid flow line of the fluid flow simulation at the respective time value of the frame.

* * * * *